United States Patent
Fujiwara

(10) Patent No.: US 7,149,345 B2
(45) Date of Patent: Dec. 12, 2006

(54) EVALUATING METHOD, GENERATING METHOD AND APPARATUS FOR THREE-DIMENSIONAL SHAPE MODEL

(75) Inventor: Koji Fujiwara, Osaka (JP)

(73) Assignee: Minolta Co., Ltd., Osaka (JP)

( * ) Notice: Subject to any disclaimer, the term of this patent is extended or adjusted under 35 U.S.C. 154(b) by 806 days.

(21) Appl. No.: 10/262,856

(22) Filed: Oct. 3, 2002

(65) Prior Publication Data
US 2003/0067462 A1    Apr. 10, 2003

(30) Foreign Application Priority Data
Oct. 5, 2001    (JP) ............................. 2001-309797

(51) Int. Cl.
*G06K 9/00* (2006.01)
*G06K 9/36* (2006.01)
*G06T 15/00* (2006.01)

(52) U.S. Cl. .................. 382/154; 382/285; 348/42; 345/419; 356/12; 359/462

(58) Field of Classification Search ............... 382/154, 382/285; 345/419–427; 356/12–14; 348/42–60; 359/462–477
See application file for complete search history.

(56) References Cited

U.S. PATENT DOCUMENTS

| | | | | |
|---|---|---|---|---|
| 5,475,422 A | * | 12/1995 | Mori et al. ................... | 348/48 |
| 6,023,523 A | * | 2/2000 | Cohen et al. ................ | 382/154 |
| 6,256,036 B1 | * | 7/2001 | Matsumoto .................. | 345/419 |
| 6,363,169 B1 | * | 3/2002 | Ritter et al. ................. | 382/154 |
| 6,639,594 B1 | * | 10/2003 | Zhang et al. ................ | 345/426 |
| 6,930,681 B1 | * | 8/2005 | Raskar et al. ................ | 345/419 |

FOREIGN PATENT DOCUMENTS

JP    2000-67267    3/2000

OTHER PUBLICATIONS

Robert Cipolla et al., "The Dynamic Analysis of Apparent Contours", Proc. Third ICCV, 1990, pp. 616-623.
William J. Schroeder et al., "Decimation of Triangle Meshes", SIGGRAPH'92 Proceedings, Jul. 1992, pp. 65-70.
Matthias Eck et al., "Automatic Reconstruction of B-Spline Surfaces of Arbitrary Topological Type", SIGGRAPH'96 Proceedings, 1996, pp. 325-334.
Steve Sullivan et al., "Automatic Model Construction and Pose Estimation From Photographs Using Triangular Splines", IEEE Trans. PAMI, vol. 20, No. 10, Oct. 1998, pp. 1091-1097.
Dan Snow et al., "Exact Voxel Occupancy with Graph Cuts", Proc. CVPR, vol. 1, 2000, pp. 345-352.

* cited by examiner

*Primary Examiner*—Jingge Wu
*Assistant Examiner*—Aaron Carter
(74) *Attorney, Agent, or Firm*—McDermott Will & Emery LLP

(57) ABSTRACT

In order to simply generate an accurate three-dimensional shape model, the generating method has the step (#1) of arranging a three-dimensional shape model in an initial state in a virtual space, the step (#2) of projecting points on the three-dimensional shape model onto photographed images and specifying pixels on the respective photographed images corresponding to the points, the step (#3) of evaluating scattering of pixel values of the respective pixels on the photographed images corresponding to the points on the three-dimensional shape model, and the step (#4) of deforming the three-dimensional shape model so that the scattering of the pixel values of the respective pixels becomes small.

21 Claims, 9 Drawing Sheets

EVALUATING METHOD, GENERATING METHOD AND APPARATUS FOR THREE-DIMENSIONAL SHAPE MODEL

This application is based on application No. JP 2001-309797 filed in Japan, the content of which is hereby incorporated by reference.

BACKGROUND OF THE INVENTION

1. Field of the Invention

The present invention relates to improved generating method and apparatus for a three-dimensional shape model. Specifically, the invention relates to an improved evaluating method and a generating method for a three-dimensional shape model which are capable of easily generating a three-dimensional shape model. More concretely, the invention relates to method and apparatus for evaluating a three-dimensional shape model using a plurality of photographed images of an object from different visual points, generating method and apparatus for a three-dimensional shape model and a computer program.

2. Description of the Related Art

In recent years, a non-contact type three-dimensional shape input device is frequently used in fields of CG and industrial design. The three-dimensional shape input device emits a laser or a pattern light to an object and captures a light reflected from a surface of the object with a sensor to closely sample and input a three-dimensional shape of the object. A real shape of the object can be put into a virtual space by the three-dimensional shape input device and a desired three-dimensional shape model can be generated easily.

The above-mentioned three-dimensional shape input device utilizes light irregular reflection characteristics on the surface of the object. For this reason, shapes of an object having low surface reflectance such as black hair of a head, an object whose surface causes a mirror reflection such as metal, a transparent or semi-transparent object such as glass and the like cannot be input correctly or their data are occasionally omitted. Moreover, since a projector of a laser or a pattern light is required, the device is expensive.

On the contrary, there is a method of photographing an object using a plurality of cameras simultaneously or photographing the object using one camera successively to generate a three-dimensional shape model using the images photographed from plural visual points without projection. According to this method, it is necessary to automatically obtain corresponding points between the images according to similarity of textures in the images. Accuracy of the detection of the corresponding points is not so good because the accuracy is greatly influenced by texture, shape, lighting condition on the surface of the object. For this reason, a user occasionally specifies corresponding points in order to heighten the accuracy. Even with this method, it is difficult to correctly obtain corresponding points of an object having a texture such that a smooth shape changes gently or a repeated pattern texture. Moreover, the object having low surface reflectance, the object whose surface causes mirror reflection, the transparent or semi-transparent object have the same fault as the three-dimensional shape input device.

A method which is called as a shape from silhouette method of estimating a shape from a shielding outline of an object can be applied to an object to which corresponding points are difficult to be given. One of the silhouette methods which is used the most frequently is a volume intersection method. As shown in FIG. 11, this method obtains a common area in a three-dimensional space within silhouettes in all images. This common area is called as a visual hull. In the most general method of obtaining a visual hull, as shown in FIG. 12, a lot of cubic shape elements which are called as voxels VX are arranged in a virtual three-dimensional space. In these voxels VX, only the voxels which are projected to areas corresponding to an object in all the images are connected so that a shape of the object is reconstructed. However, this method cannot correctly reconstruct a shape of a concave section on the surface of the object which is not shown in any image as a silhouette.

The problem that the shape is not reproduced correctly arises remarkably when rendering display is executed on a display. Namely, in an incorrect shape portion, texture data which are generated by laminating input color images become indistinct on the laminated portions or a step or a distortion occurs. In other words, on a surface portion of the object having uncomplicated texture, a distortion of the laminated textures is unnoticeable, and the distortion of the shape seldom influences an image of rendering display. From this viewpoint, Snow and the others suggest a method of smoothly connecting subsets with small scattering of pixel values between corresponding pixels in images from plural visual points in lattice points in a virtual space as a new attempt. However, in this method, the accuracy of the shape depends on a width of the lattices. When a number of lattice points is increased in order to heighten the accuracy, a data amount increases and simultaneously an executing speed drops abruptly. Moreover, the shape of the silhouette obtained by rendering the restored data becomes ragged due to aliasing of the lattices.

As mentioned above, as the method of generating a three-dimensional shape model, various methods have been suggested conventionally. However, any method has the above-mentioned problem, and a three-dimensional shape model which is suitable to high-quality rendering cannot be generated simply.

OBJECTS AND SUMMARY

The present invention is devised in order to solve the above problems, and an object is to provide improved three-dimensional model generating method and apparatus. More concretely, an object is to provide improved three-dimensional shape model evaluating method, generating method and apparatus which are suitable to high-quality rendering and are capable of simply generating a three-dimensional shape model.

In order to achieve the above object and another object, a three-dimensional shape model evaluating apparatus according to a certain aspect of the present invention has projecting means for projecting points on the three-dimensional shape model onto a plurality of photographed images of an object from different visual points, specifying means for specifying pixels on the photographed images corresponding to the points, and evaluating means for evaluating scattering of pixel values of the pixels on the photographed images corresponding to the points on the three-dimensional shape model.

In another aspect, the evaluation of the scattering of the pixel values is evaluation of scattering of colors. Moreover, the evaluating apparatus has a display device for displaying the scattering of the pixel values of the pixels on the photographed images corresponding to the points on the three-dimensional shape model.

In addition, a generating apparatus for generating a three-dimensional shape model of an object based on a plurality of photographed images of the object has arranging means for arranging a three-dimensional shape model in an initial state in a virtual space, specifying means for projecting points on the three-dimensional shape model onto the photographed images and specifying pixels on the photographed images corresponding to the points, evaluating means for evaluating scattering of pixel values of the pixels on the photographed images corresponding to the points on the three-dimensional shape model, and deforming means for deforming the three-dimensional shape model so that the scattering of the pixel values of the pixels becomes small.

Preferably, the generating apparatus has fidelity evaluating means for evaluating fidelity of the silhouette of the object by means of the photographed images to the three-dimensional shape model. The deforming means deforms the three-dimensional shape model by means of the evaluated result of the fidelity evaluating means.

In another aspect, the three-dimensional shape model is generated based on a visual hull in the virtual space within the silhouettes of the photographed images, and the generated three-dimensional shape model is arranged as the three-dimensional shape model in the initial state.

Further, in another aspect, in the case where the points to be specified by the specifying means are shielded by another portion of the three-dimensional shape model and are not projected onto the photographed images, and in the case where the points are projected out of the photographed images, there exist no pixels corresponding to the points on the photographed images from visual points, and the points are excluded from the evaluation of the scattering of the pixel values of the pixels.

Further, in another aspect, in the case where the pixels on the photographed images corresponding to the points on the three-dimensional shape model do not exist within the silhouettes of the object, the scattering of the pixel values of the pixels is increased as penalty.

A three-dimensional shape model evaluating method according to a certain aspect of the present invention has the steps of preparing a plurality of photographed images of an object from different visual points, projecting points on a three-dimensional shape model onto the photographed images and specifying pixels on the photographed images corresponding to the points, and evaluating scattering of pixel values of the pixels on the photographed images corresponding to the points on the three-dimensional shape model.

Further, a generating method of generating a three-dimensional shape model of an object based on a plurality of photographed images of the object according to a certain aspect of the present invention has the steps of arranging a three-dimensional shape model in an initial state in a virtual space, projecting points on the three-dimensional shape model onto the photographed images and specifying pixels on the photographed images corresponding to the points, evaluating scattering of pixel values of the pixels on the photographed images corresponding to the points on the three-dimensional shape model, and deforming the three-dimensional shape model so that the scattering of the pixel values of the pixels becomes small.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawing.

DETAILED DESCRIPTION OF THE PREFERRED EMBODIMENTS

Figure 1:
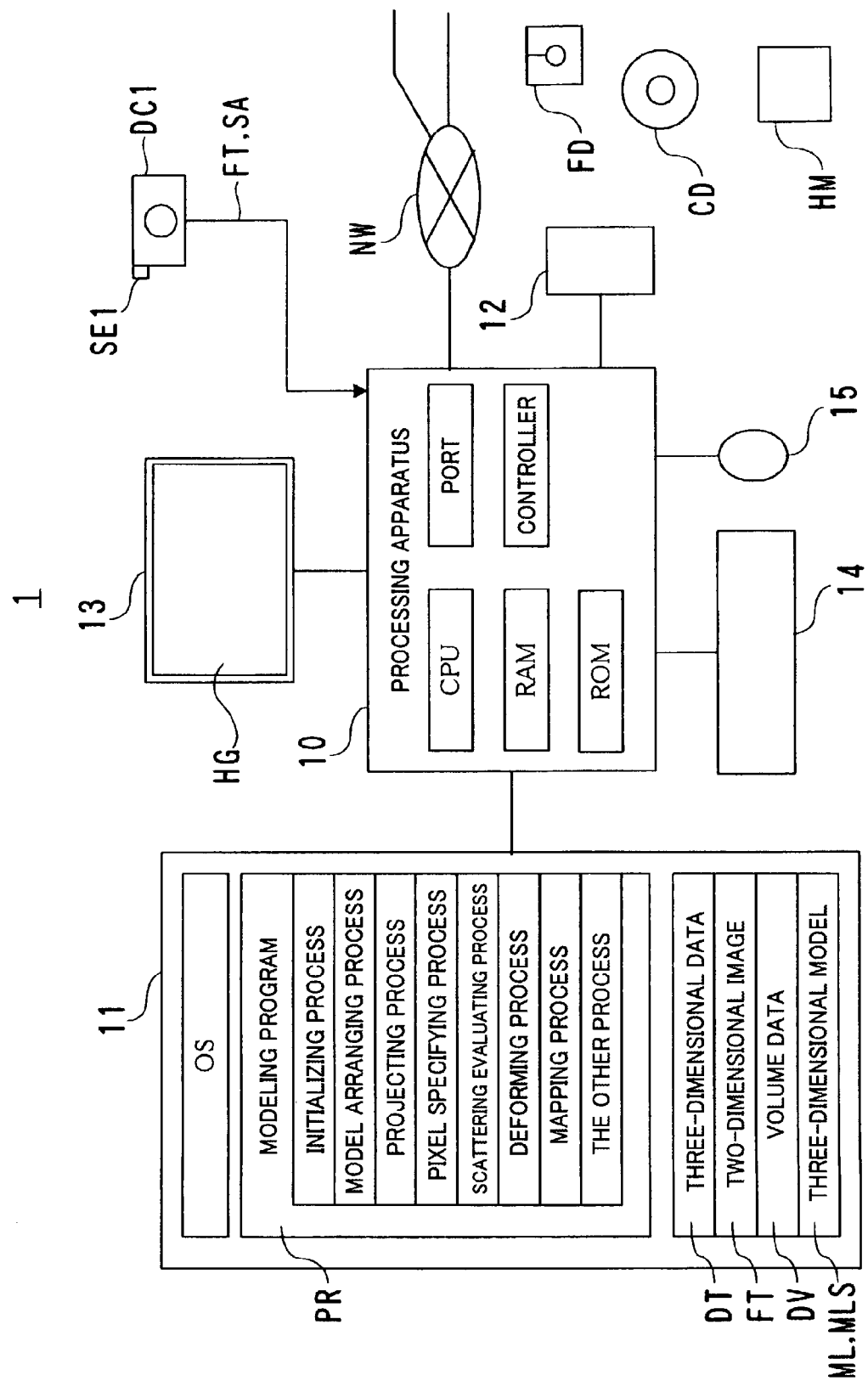
FIG. 1 is a block diagram of a three-dimensional shape model generating apparatus according to the present embodiment.
Figure 2:
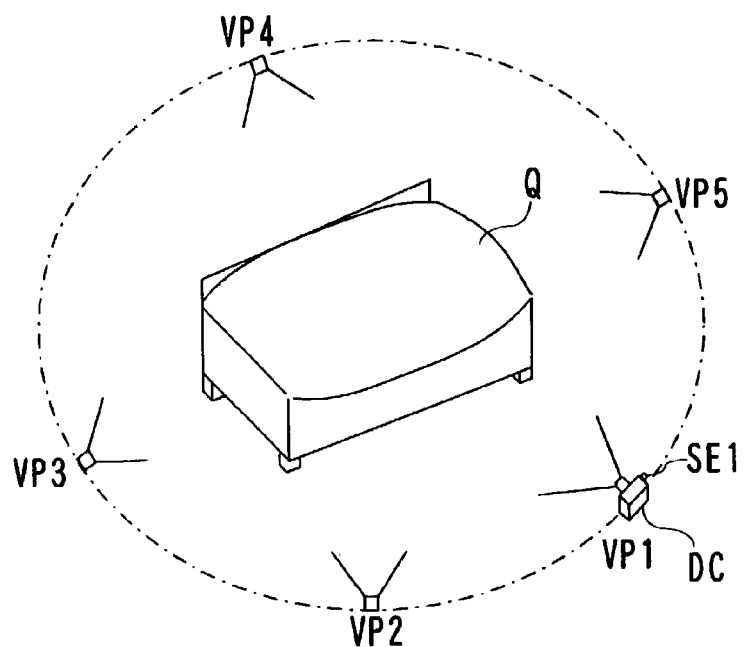
FIG. 2 is a diagram for explaining a state that an object is photographed.
Figure 3:
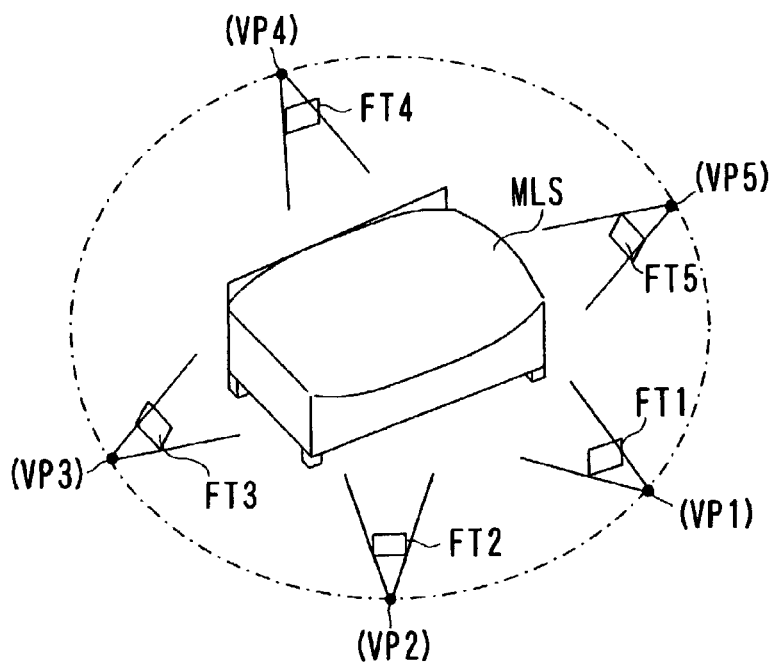
FIG. 3 is a diagram for explaining a state that points on the three-dimensional model of the object are projected onto images, respectively.
Figure 4:
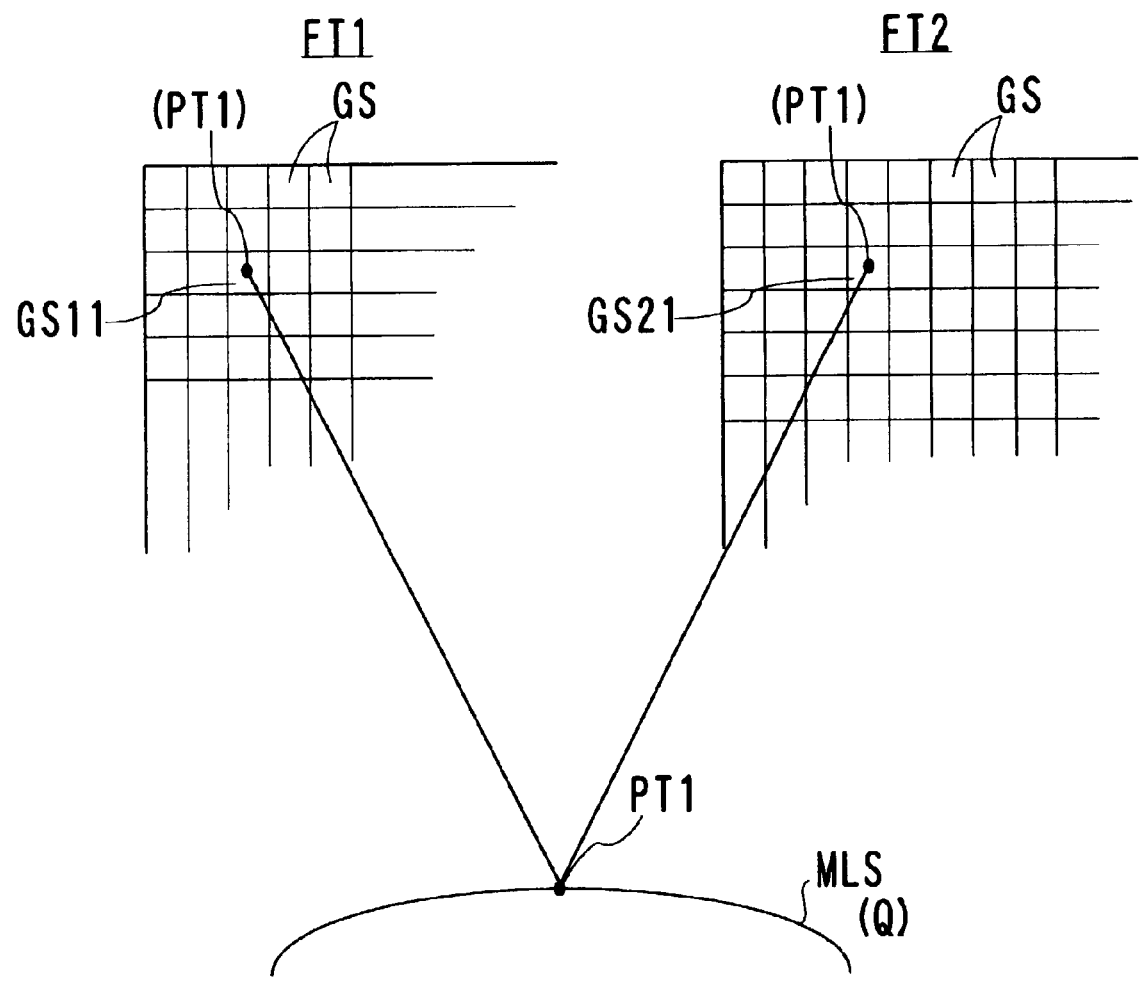
FIG. 4 is a diagram showing pixels corresponding to the points projected onto the image.
Figure 5:
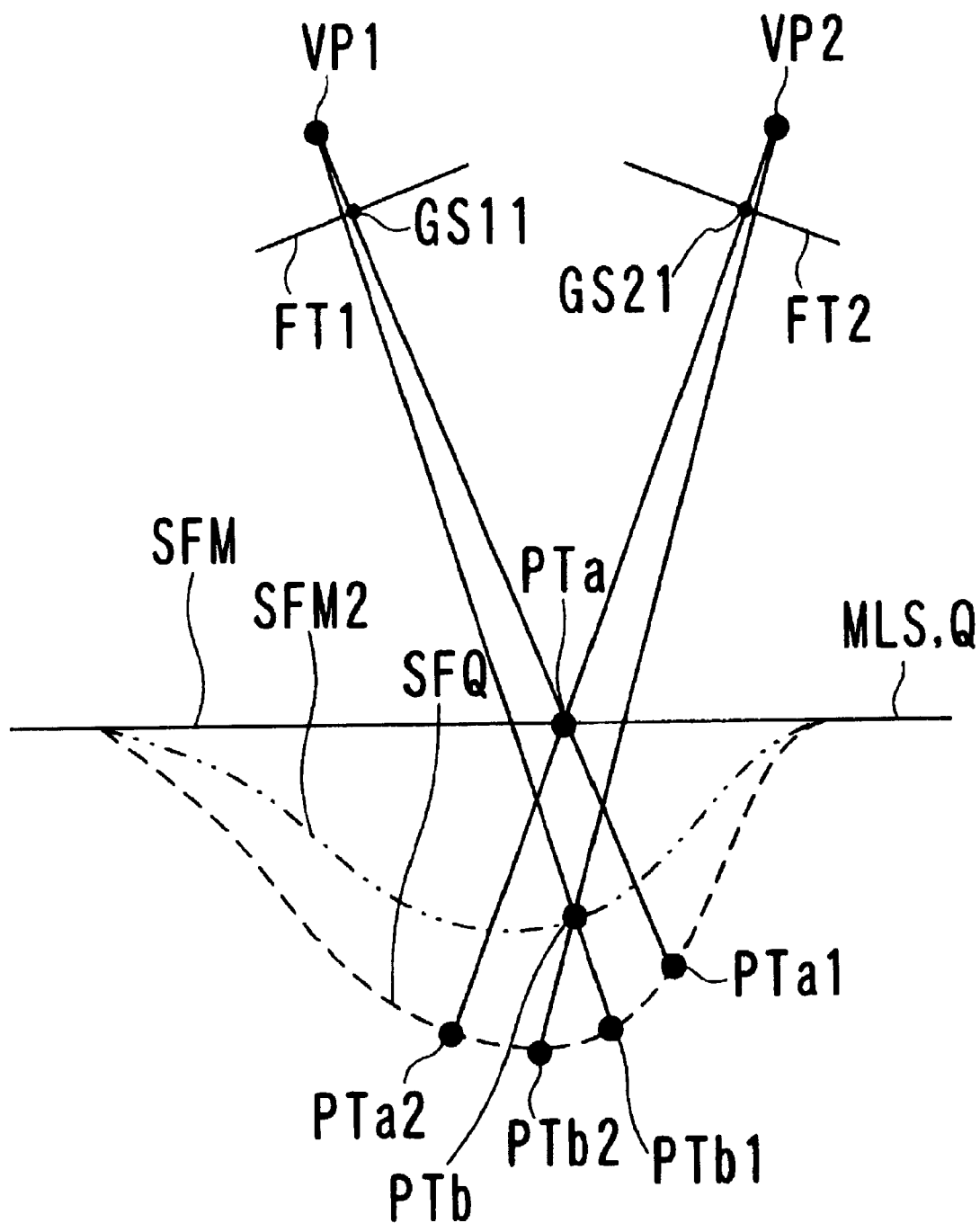
FIG. 5 is a diagram showing a state that scattering of pixel values of respective pixels on the images is evaluated.

FIG. 1 is a block diagram of a three-dimensional shape model generating apparatus 1 according to the present embodiment. FIG. 2 is a diagram for explaining a state that an object Q is photographed. FIG. 3 is a diagram for explaining a state that points on a three-dimensional model MLS of the object Q are projected onto images FT, respectively. FIG. 4 is a diagram showing pixels GS corresponding to points PT projected onto the images FT. FIG. 5 is a diagram showing a state that scattering of pixel values of the respective pixels on the images FT is evaluated.

In FIG. 1, the generating apparatus 1 is composed of an apparatus main body 10, a magnetic disk device 11, a medium drive device 12, a display device 13, a keyboard 14 and a mouse 15.

The apparatus main body 10 is composed of a CPU, a RAM, a ROM, a video RAM, an I/O port and various controllers. Programs stored in the RAM and the ROM are executed by the CPU, so that various functions, mentioned later, are realized.

The magnetic disk device 11 stores an OS (Operating System), a modeling program PR for generating or evaluating a three-dimensional model (a three-dimensional shape model) ML, another programs, input or generated three-dimensional data (three-dimensional shape data) DT and DTS, an image (two-dimensional image data) FT, the generated three-dimensional model ML, another data and the like. The programs and the data are loaded into the RAM of the apparatus main body 10 at suitable time.

The modeling program PR includes programs of an initializing process, a model arranging process, a projecting process, a pixel specifying process, a scattering evaluating process, a deforming process, a mapping process and another process.

The medium drive device 12 accesses to a CD-ROM (CD), a floppy disk (FD), a magneto-optic disk, a semiconductor memory HM such as a compact flash (registered trademark) and another recording medium, to read and write data or programs. A suitable drive device is used according to types of the recording media. The above-mentioned modeling program PR can be installed from the recording media. The three-dimensional data DT and the image FT can be input via the recording media.

The above-mentioned various data, the three-dimensional data DT, the image FT, an image at the processing step by the modeling program PR, the generated three-dimensional model ML, scattering of pixel values of respective pixels on the images corresponding to points of the three-dimensional model and another data or images are displayed on a display surface HG of the display device 13.

The keyboard 14 and the mouse 15 are used by a user for making various specifications for the image FT and the three-dimensional data DT displayed on the display device 13, and are used for inputting various data or giving orders to the apparatus main body 10.

The apparatus main body 10 is connected with a digital camera DC for photographing the object Q (subject) with various visual lines or from various visual points and inputting the images FT. The digital camera DC is provided with a position posture sensor SE1 for detecting its position and posture and outputting position posture information SA. The position posture information SA as well as the images FT is temporarily stored in the digital camera DC and they are transmitted to the generating apparatus 1 in the mass. As the position posture sensor SE1, for example, a gyro sensor with an acceleration sensor is used.

In FIG. 2, the object Q is photographed from circumferential visual points VP1 to 5 by the digital camera DC. As result, images FT1 to 5 are obtained. The images FT1 to 5 are temporarily stored in the magnetic disk device 11 of the generating apparatus 1.

In the apparatus main body 10, three-dimensional data DTS1 are generated based on a visual hull in a virtual space within silhouettes of the input images FT. More concretely, outlines of the object Q are cut out from the input images FT so that silhouette images FS are generated, and the three-dimensional data DTS1 are generated based on the silhouette images FS by the silhouette method.

In addition, three-dimensional reconstruction is carried out based on two images FT with parallax, so that three-dimensional data DTS2 can be generated. The generated three-dimensional data DTS1 and DTS2 can be used as a three-dimensional shape model MLS in an initial state according to the present invention.

In addition, the apparatus main body 10 can be connected with a three-dimensional input device (three-dimensional measuring device) for photographing an object and inputting its three-dimensional data DTS3. Such a three-dimensional input device measures the three-dimensional data DTS3 of the object Q according to, for example, an optical cutting method in a non-contact manner. Moreover, not the three-dimensional data DTS3 but data which are origin for generating the three-dimensional data DTS3 are output from the three-dimensional input device, and the three-dimensional data DTS3 may be obtained by operation by means of the apparatus main body 10. Also such three-dimensional data DTS3 can be used as the three-dimensional model (three-dimensional shape model) MLS in the initial state according to the present invention.

As shown in FIG. 3, the three-dimensional model MLS in the initial state is arranged in a memory space (virtual space) VS1 of the apparatus main body 10. In the virtual space VS1, the three-dimensional model MLS in the initial state is evaluated as to whether or not it is a three-dimensional model suitable to high-quality rendering or whether or not it is an accurate three-dimensional model of the object. Moreover, the evaluated result is displayed on the display surface HG of the display device 13. Further, the three-dimensional model MLS is deformed based on the evaluated result. The deformed three-dimensional model MLS is again evaluated and deformed, and this is repeated so that a final three-dimensional model ML is generated.

The generating apparatus 1 can be constituted by using a personal computer or a work station. The above-mentioned programs and data can be obtained by receiving them via a network NW.

Next, there will be explained below the evaluating method and the deforming process of the three-dimensional model.

In FIG. 3, the respective images FT1 to 5 are arranged in the virtual space VS1 so as to coincide with photographed visual points VP1 to 5 with respect to the three-dimensional model MLS. In this state, sampled points PT on the three-dimensional model MLS are projected onto the images FT1 to 5, respectively.

For example as shown in FIG. 4, the point PT1 on the three-dimensional model MLS is projected onto the images FT1 and 2. On the images FT1 and 2, pixels GS11 and GS21 including the projected point PT1 are specified as corresponding pixels. This specification is carried out for a lot of points on the three-dimensional model MLS, for example, constitutional points composing the three-dimensional model MLS.

Here, as the pixel GS corresponding to the point PT on the image FT, two or more pixels GS are occasionally specified. In this case, an average or a root-mean-square of the pixel values of the pixels may be used as the pixel values. Moreover, in the case where the points PT to be projected are shielded by another portion of the three-dimensional model MLS, the image FT is treated so that corresponding points, namely, corresponding pixels GS do not exist.

When the corresponding pixels GS are specified, the pixel values of the pixels GS are obtained. As the pixel values, for examples, density values of the pixels are used. In the case where the images FT are color images, density values of the three primary colors are used.

Scattering of the obtained pixel values is obtained. As the scattering, for example, a difference of the pixel values is obtained, and an absolute value, an average value or root-mean-square of the difference is obtained. They are evaluated. At the time of the evaluation, for example, a magnitude of the scattering is evaluated. The three-dimensional model MLS is deformed so that the scattering becomes minimum.

For example in the case where the images FT are color images, scattering of the colors is evaluated. As the scattering of the colors, density values of the three primary colors is evaluated. In another way, hues of the colors of the pixels GS are compared so that a magnitude of their difference is evaluated.

In FIG. 5, a surface SFQ of the object Q is shown by a broken line, and a surface SFM of the three-dimensional model MLS of the object Q is shown by a solid line. Pixels GS11 and GS21 on the images FT1 and 2 corresponding to one point PTa on the surface SFM of the three-dimensional model MLS are specified, so that density values GST11 and GST21 of the pixels are obtained.

When the density values GST11 and GST21 coincide with each other, it can be concluded that the point PTa on the surface SFM of the three-dimensional model MLS mirrors the point on the surface of the object Q correctly. This is because since the two images FT1 and 2 are obtained by photographing the real surface of the object Q, density values of pixels corresponding to one point on the surface approximately coincides if a perfect reflecting diffuser.

However, in he case of FIG. 5, the surface SFQ of the object Q is a concave section, and this concave section is not mirrored on the three-dimensional model MLS correctly. This phenomenon frequently and possibly occurs in the case where the three-dimensional model MLS is generated from the object Q by using the silhouette method or the cubic photography method.

As a result, the pixels GS11 and GS21 corresponding to the point PTa on the surface SFM of the three-dimensional model MLS actually correspond to points PTa1 and Pta2 on the surface SFQ of the object Q. However, in the case where surface reflectance are different between the points PTa1 and PTa2, since the density value GST11 of the pixel GS11 is different from the density value GST21 of the pixel GS21, discrepancy occurs at the time of rendering and this causes indistinctness and distortion of the rendering image. When the surface reflectances at the points PTa1 and PTa2 are the same, even when the three-dimensional model MLS does not mirror the surface SFQ correctly, discrepancy seldom occurs at the time of the rendering.

When the density value GST11 is compared with the density value GSTS21, a degree of coincidence between the surface SFM of the three-dimensional model MLS and the actual surface SFQ of the object Q can be evaluated.

Therefore, a degree of the discrepancy at the time of the rendering can be evaluated by a difference of the density values GST of the corresponding pixels GS.

As one method from which a user knows a degree of the evaluation, the three-dimensional model MLS is displayed on the display surface HG of the display device 13, and the scattering of the density values GST of the pixels corresponding to the points is displayed. For example, the density according to the difference in the density values GST or a color image is displayed. In another way, the difference value of the density values GST is displayed on an image with numerical value. Moreover, when a user specifies an arbitrary point on the three-dimensional model MLS on the image, a color difference of the pixel corresponding to the point is displayed by a color histogram or the like (see FIG. 9).

When there is scattering between the density value GST11 and the density value GST21, the surface SFM of the three-dimensional model MLS is deformed to a direction where the scattering is decreased.

In FIG. 5, a deformed surface SFM2 is shown by a chain line. Pixels GS which correspond to the points PTb on the surface SFM2 are obtained, and their density values are compared. The surface SFM of the three-dimensional model MLS is again deformed to a direction where scattering is decreased. When this is repeated, the accurate three-dimensional model ML is generated.

As mentioned above, in the present embodiment, a restricted curved surface model or a polygon mesh model is deformed so as to conform to the images obtained by photographing the object Q from different visual points, namely, so that respective sections of the three-dimensional model MLS become smooth. At this time, the scattering of the colors between the points on the images FT projected to the points on the three-dimensional model MLS is checked, and the model is deformed so that the scattering of the colors becomes minimum. As a result, the smooth three-dimensional model ML having arbitrary phase is generated. The color image is laminated to the generated three-dimensional model ML so that a texture is laminated.

As a result, a curved surface model with high-quality texture can be generated stably for the object Q having a gently changing texture or a repeated pattern texture. This is difficult in the method of generating a three-dimensional model from normal multi-visual point images.

Further, when the method of obtaining the three-dimensional model of the object Q from silhouettes is combined with the above method, the present invention can cope with the object Q of an arbitrary phase and a silhouette shape can be displayed accurately.

In the present embodiment, in a surface area where the colors are uniform, occasionally a surface shape is not reconstructed correctly. However, since the generated texture (color) is equal or equivalent to the correct shape, there is an advantage that when the rendering display is executed on the display surface HG, incorrect shape is not noticeable.

In addition, when the scattering of the colors is displayed on the display surface HG, a user can visibly recognize a portion where discrepancy easily occurs at the time of the rendering. Moreover, an image FT where a position of the digital camera DC is not corrected accurately can be specified. As a result, the user can easily correct the three-dimensional model MLS or correct the position of the camera.

There will be explained below the entire generating process for three-dimensional model ML in the generating apparatus 1 with reference to the flowchart.

Figure 6:
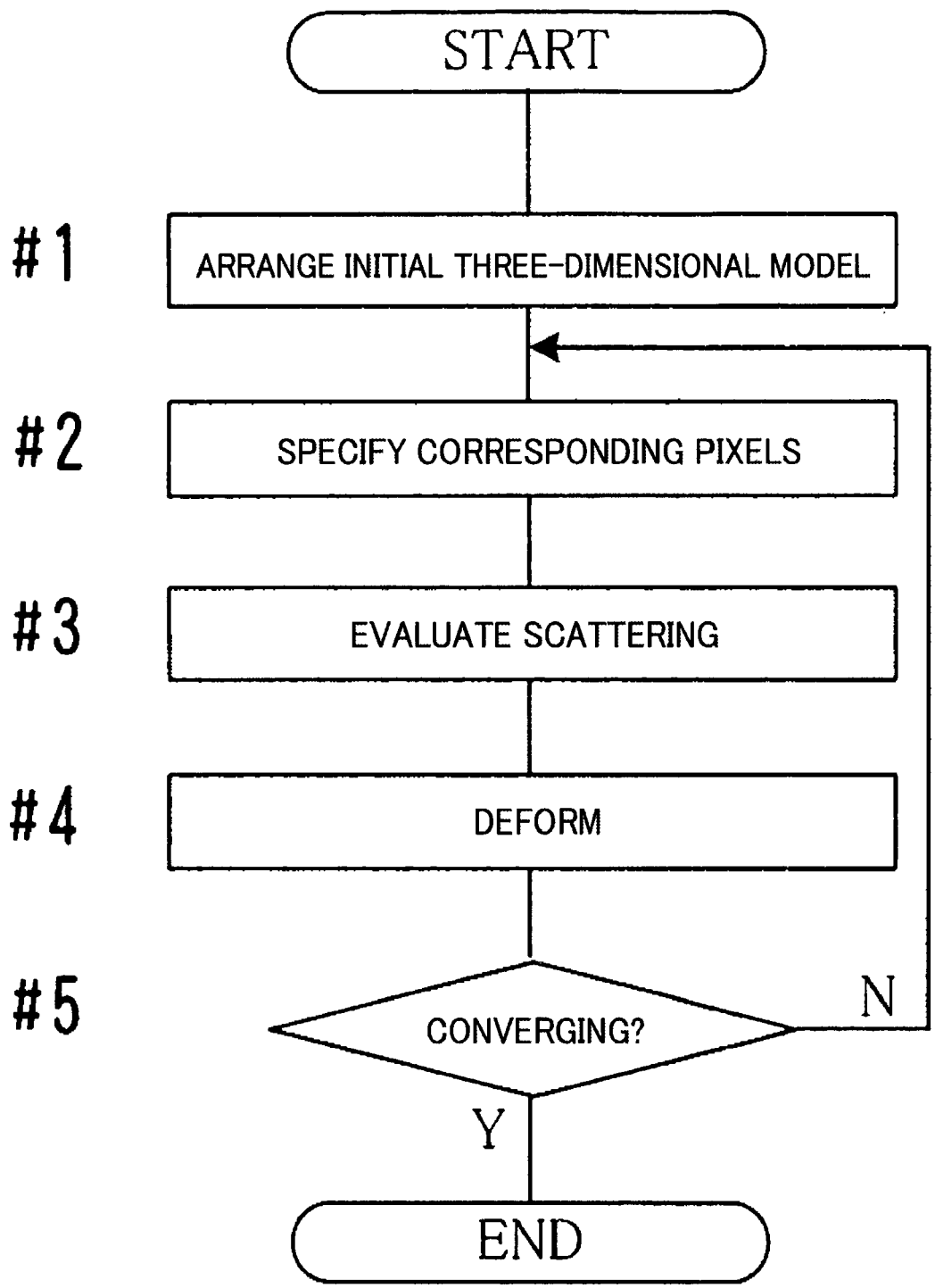
FIG. 6 is a flowchart showing a three-dimensional model generating process.

FIG. 6 is a flowchart showing the three-dimensional model generating process.

In FIG. 6, the three-dimensional model MLS in the initial state is arranged in the virtual space VS1 (#1). Points on the three-dimensional model MLS are projected onto the images FT, and pixels GS on the images FT corresponding to the points are specified (#2). The scattering of the pixel values of the pixels GS on the images FT corresponding to the points on the three-dimensional model MLS is evaluated (#3). The three-dimensional model MLS is deformed so that the scattering of the pixel values of the pixels GS becomes minimum (#4). The steps after step #2 are repeated, and when the scattering is evaluated as being smaller than a predetermined value, the process is ended (#5).

Further detailed explanation will be given.

Figure 7:
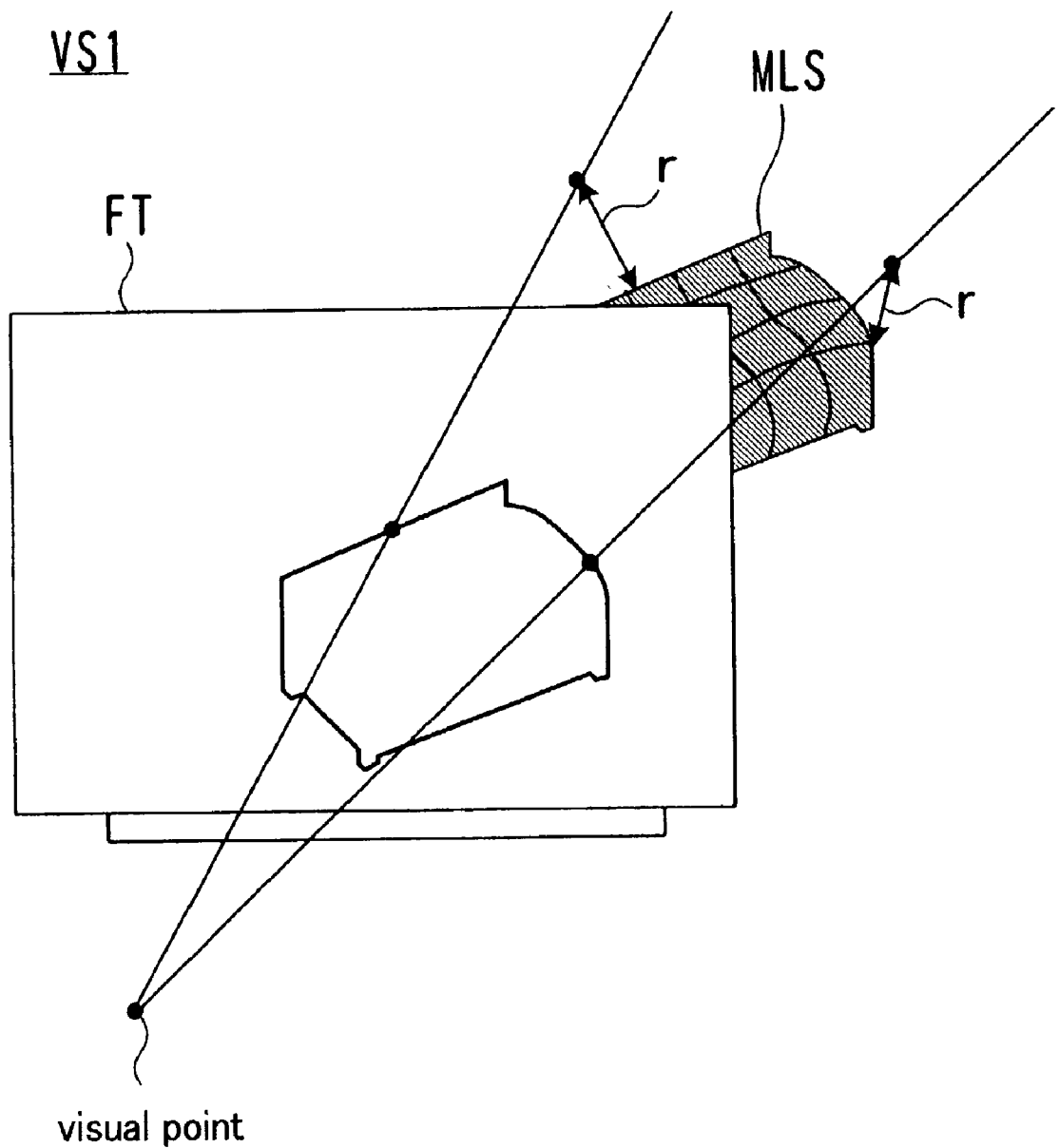
FIG. 7 is a diagram for explaining a relationship between the three-dimensional model and visual lines of a silhouette image.
Figure 8:
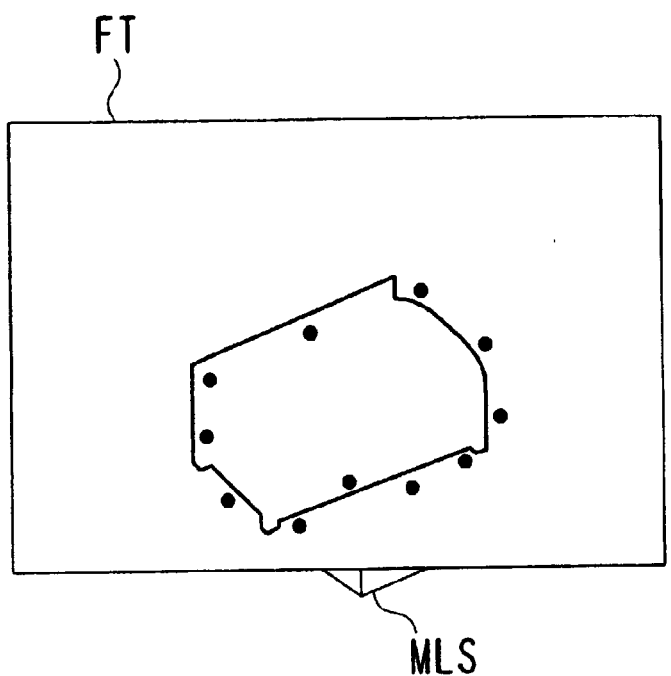
FIG. 8 is diagram showing a distance on the silhouette image.
Figure 9:
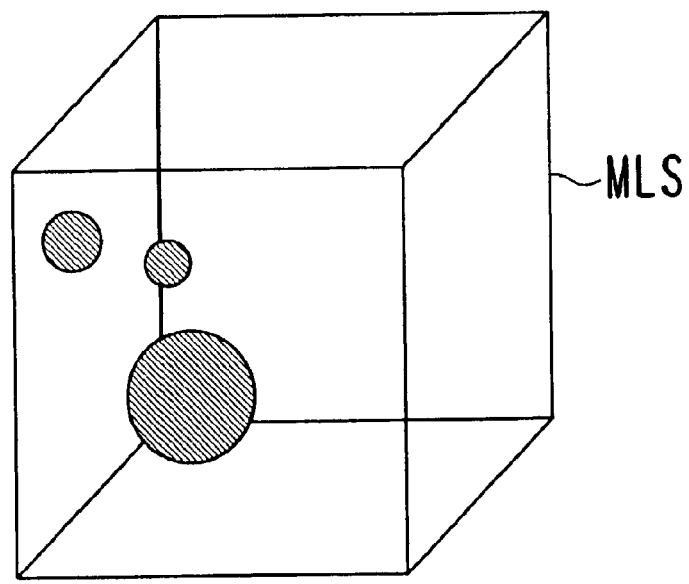
FIG. 9 is a diagram showing an example of a color histogram displayed on the three-dimensional model.
Figure 10:
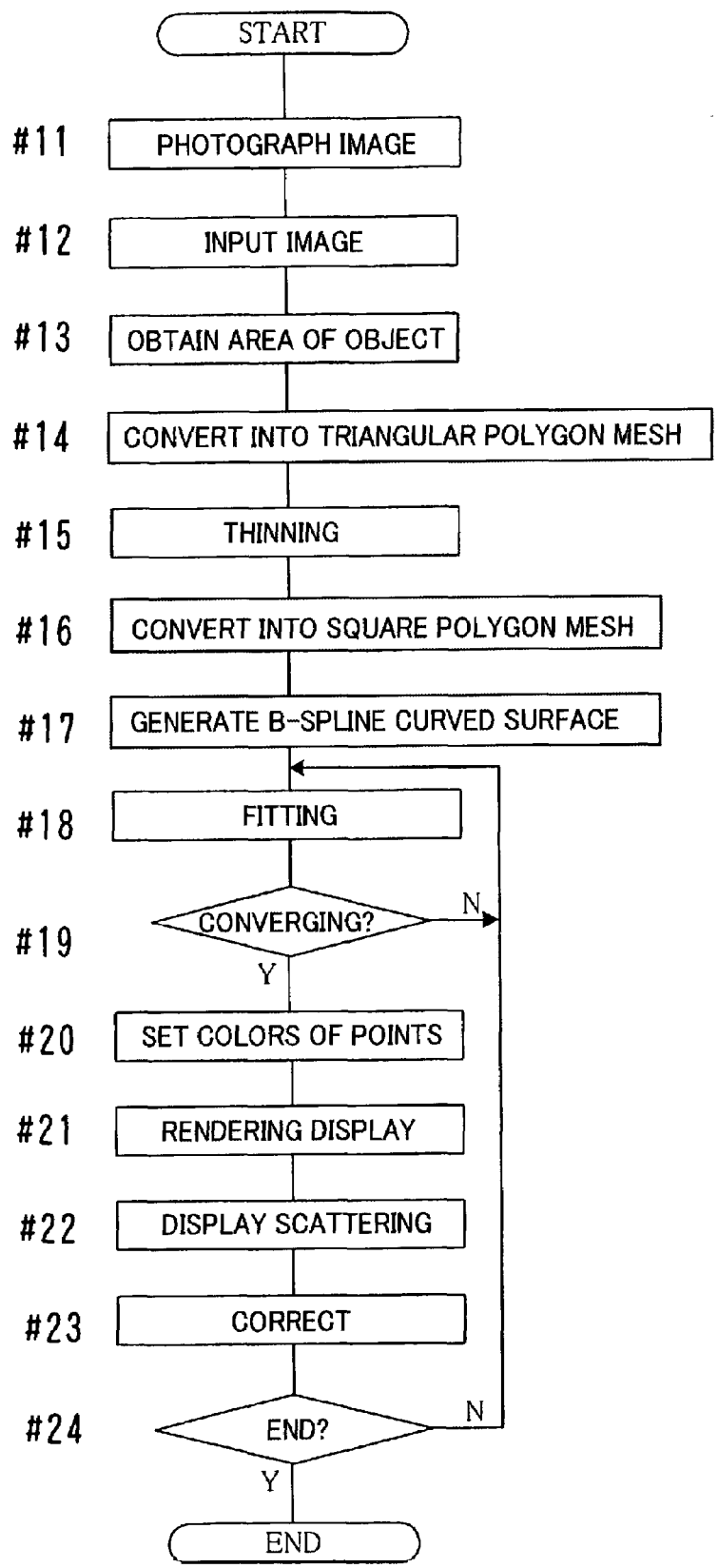
FIG. 10 is a flowchart showing the three-dimensional model generating process.
Figure 11:
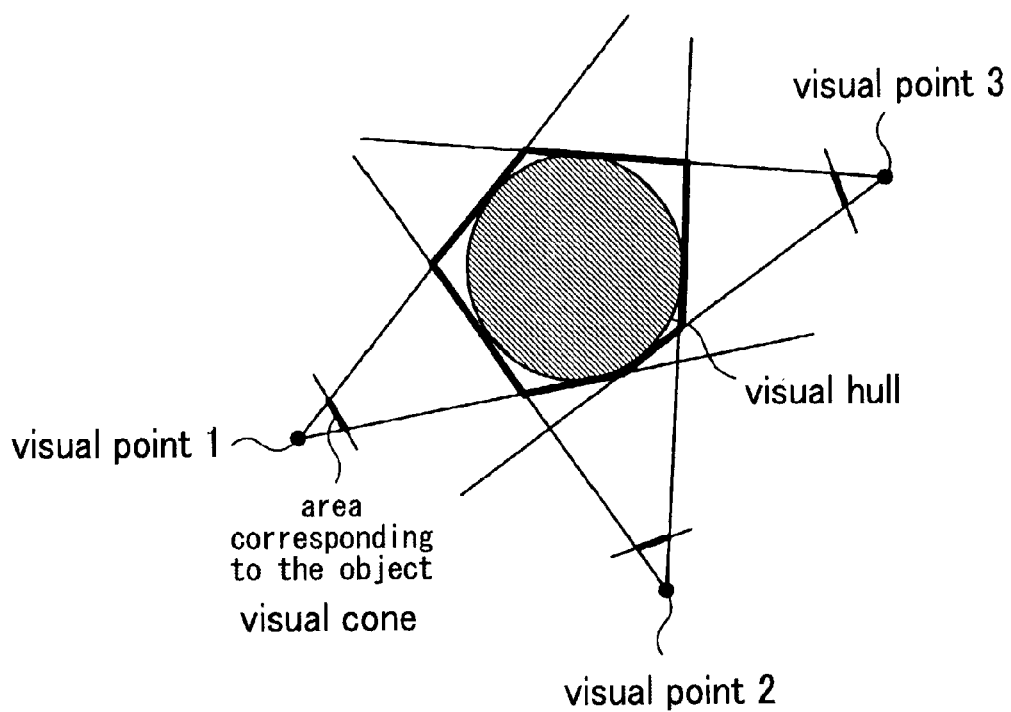
FIG. 11 is a diagram showing an example that a visual hull is obtained by a shape from silhouette method.
Figure 12:
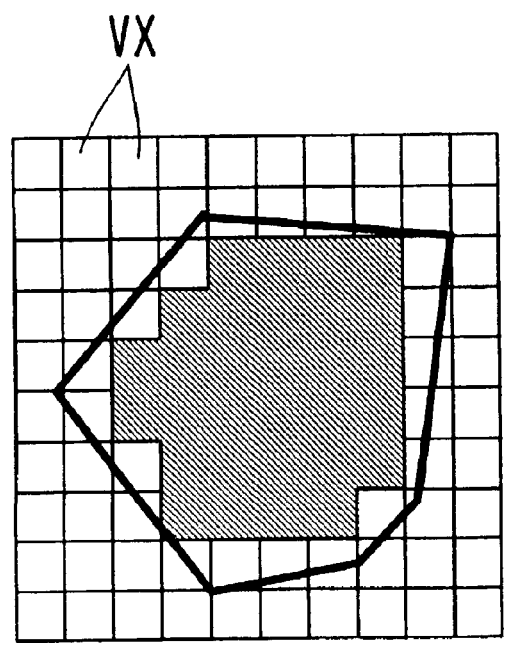
FIG. 12 is a diagram showing an example of voxels in the visual hull.

FIG. 7 is a diagram for explaining a relationship between the three-dimensional model MLS and visual lines due to the silhouette images, FIG. 8 is a diagram showing a distance on the silhouette images, FIG. 9 is a diagram showing an example of the color histogram displayed on the three-dimensional model, and FIG. 10 is a flowchart showing the three-dimensional model generating process.

Firstly, the object Q is photographed from plural visual points by the digital camera DC, and the obtained color images FT are stored in a storage section in the camera (#11). At this time, information about positions and postures of the digital camera DC when the images FT are photographed (position posture information SA) is obtained by the position posture sensor SE1 attached to the digital camera DC to be stored together with optical unit control signals such as diaphragm, focal length and photographing visual points into the storage section of the camera.

The images FT obtained from the visual points and the position posture information SA and the optical unit control signals are united to be transmitted to the generating apparatus 1 (#12). In the generating apparatus 1, the input information and signals are temporarily stored in the magnetic disk device 11, and are read into the RAM by the modeling program PR. The correspondence table of control signal optical parameters and optical parameters is prepared, and the respective optical unit control signals are converted into optical parameters based on the correspondence table at the time of reading.

An area of the object Q is obtained on the respective images FT, and its boundary is recorded as a silhouette (#13). In order to obtain the area of the object in the respective images, for example, the user uses the mouse 15 to trace the area boundary. In another way, a curved line model which is called as "Snake" is fitted to an edge image and the area may be automatically extracted. As for "Snake", refer to R. Cipolla and A. Blake, "The Dynamic Analysis of Apparent Contours," Proc. Third ICCV, 1990.

A rough three-dimensional shape of the object is obtained by a volume intersection method, and its result is converted into a triangular polygon mesh (#14). Namely, for example, volume data are generated based on the silhouettes obtained from the images FT, and the volume data are converted from a volume expression form into a boundary expression form so that triangular polygon mesh data are obtained.

The triangular polygon mesh is thinned to be converted into a triangular polygon mesh having more rough resolution (#15) As a result, a data amount is reduced. The thinning process can be executed by deleting apexes from a flat portion successively as described in, for example, William J. Schroeder, Jonathan A. Zarge and William E. Lorensen, "Decimation of Triangle Meshes", SIGGRAPH'92 Proceedings, 1992, Pages 65–70.

The triangular polygon mesh is converted into a square polygon mesh (#16). This can be executed by combining adjacent triangles to form a square as described in, for example, Matthias Eck and Hugues Hoppe, "Automatic reconstruction of B-spline surfaces of arbitrary topological type", SIGGRAPH'96 Proceedings, 1996, Pages 325–334. As a result, a number of apexes in data for specifying the polygons is changed from 3 into 4.

According to the method in the literature of Eck described as an example of the process at step #16, a B-spline curved surface is generated from a base square mesh (#17). With this method, control points of the B-spline curved surface are given by affine connection of apexes of the original square mesh. As a result, the three-dimensional model MLS in the initial state is generated. The three-dimensional model MLS is arranged in the virtual space VS1.

In the present embodiment, the B-spline curved surface is used, but curved surfaces of another expression such as implicit multiple function, verge curved surface patch, Gregory patch, NURBS and finely dividing curved surface may be used.

Fitting is performed (#18). In the fitting, a curved surface is fitted to the respective silhouette images or the images so that an energy J defined by the following equation (1) becomes minimum.

$$J = \lambda_0 J_0 + \lambda_1 J_1 + \lambda_2 J_2 \quad (1)$$

$$J_0 = \sum_i \sum_j \|p_{ij} - o_i - v_{ij}^1 (p_{ij} - o_i) v_{ij}^1\|^2$$

$$J_1 = \sum_k \sum_i (\sigma^2 + e^2)$$

$$J_2 = \sum_k (\alpha_{uu} \|s_k^{uu}\|^2 + \alpha_{uv} \|s_k^{uv}\|^2 + \alpha_{vv} \|s_k^{vv}\|^2)$$

Here, $\lambda_0$, $\lambda_1$, $\alpha_{uu}$, $\alpha_{uv}$ and $\alpha_{vv}$ are constants specified by a user.

In addition, $J_0$ is a square sum of distances between visual lines $l_{ij}$ passing through a j-th point on an i-th silhouette and points on the curved surface closest to the visual lines (coordinates are given by $P_{ij}$) as described in the method by Sullivan and the others (Steve Sullivan and Jean Ponce, "Automatic Model Construction and Pose Estimation From Photographs Using Triangular Splines," IEEE Trans. PAMI, 20(10), pp. 1091–1097, 1998.). Namely, an internal equation of an absolute value symbol in the equation representing $J_0$ corresponds to the distance r shown in FIG. 7. However, it is supposed that a coordinate x of an arbitrary point on the visual lines $l_{ij}$ is represented by the following equation (2) by using camera visual point coordinates $o_I$ of the respective images and unit direction vectors $v_{ij}$ of visual lines from visual points.

$$x = tv_{ij} + o_I \quad (2)$$

In addition, $j_1$ in the equation (1) is a sum of magnitudes of covariance matrices of color vectors of the pixels at the points corresponding to the images on the curved surface. In the equation (1), a term shown by $J_1$ is peculiar to the present embodiment. Namely, σ shown in the equation $J_1$ represents the scattering of the pixel values of the pixels on the images FT corresponding to the points on the three-dimensional model MLS.

Here, a magnitude of the covariance matrix of the color vector of the pixels corresponding to the images at the k-th point on the curved surface is represented by the following equation (3) by using a color vector $c_{ki}$ of the pixels corresponding to the i-th image.

$$\sigma^2 = \begin{cases} \frac{1}{N_k} \|(c_{ki} - m_k)(c_{ki} - m_k)^t\|, & i \in F_k \\ 0, & i \notin F_k \end{cases} \quad (3)$$

$$m_k = \frac{1}{N_k} \sum_{i \in F_k} c_{ki}$$

However, $F_k$ is aggregation of numbers of images to be projected into the silhouette of the object Q in the images in which a k-th point on the curved surface is not shielded by another portion of the three-dimensional model and is projected thereonto.

In addition $e^2$ is a penalty for projecting the k-th point on the curved surface out of the silhouette of the object and is represented by the following equation (4).

$$e^2 = \begin{cases} 0, & i \notin B_k \\ d^2, & i \in B_k \end{cases} \quad (4)$$

However, $B_k$ is aggregation of numbers of images to be projected out of the silhouette of the object Q in the images in which the k-th point on the curved surface is not shielded by another portion of the three-dimensional model and is projected thereonto.

When $J_1$ is made to be minimum, the curved surface model is deformed so that the colors of pixels corresponding to the respective portions of the object do not conflict preferably.

In addition, $J_2$ in the equation (1) is a square sum of magnitudes of secondary differentiation at the points on the curved surface as explained in the method of Sullivan, and smoothly connects the curved surface model to its periphery at a portion which is not close to the silhouette data or a portion where corresponding pixels do not exist. At this time, since the control points of the B-spline are constituted by affine-connection of the apexes of the original square mesh, actual independent parameters are apex coordinate matrix of the original square mesh. Namely, a coordinate $P_k$ at the k-th point on the curved surface and secondary differential vectors $S^{uu}{}_k$, $S^{uv}{}_k$ and $S^{vv}{}_k$ at that point can be expressed by the following equation (5) by using apex coordinates $q_1, \ldots, q_N$ of the base polygon mesh.

$$p_k = \sum_1 \beta_{kl} q_1 \qquad (5)$$

$$s_k^u = \sum_1 \beta_{kl}^u q_1, s_k^v = \sum_1 \beta_{kl}^v q_1, s_k^{uu} = \sum_1 \beta_{kl}^{uu} q_1, s_k^{uv} = \sum_1 \beta_{kl}^{uv} q_1, s_k^{vv} = \sum_1 \beta_{kl}^{vv} q_1,$$

Here, $\beta^*{}_{k1}$ is a constant which is determined from B-spline function parameters corresponding to the points on the curved surface.

Therefore, the fitting of the curved surface is the same as that a base square mesh is obtained so that B-spline curved surface which makes J minimum is generated.

The base square mesh which makes J minimum can be obtained by a method such as secondary converging method of Powell.

In the present embodiment, $J_0$ is a root-mean-square of a three-dimensional distance r of the points on the curved surface which are the closest to the visual lines in the three-dimensional virtual space VS1 as shown in FIG. 7. However, as shown in FIG. 8, a square sum of the image distance of the points on the curved surface silhouette which are the closest to the points on the silhouette of the object Q on the images FT may be used.

Further, in the present embodiment, the B-spline curved surface is used as a model, but polygon mesh may be used as a model. In this case, the steps #15 through #17 can be omitted. Moreover, $J_2$ at the step #18 may be defined as a spring energy when edges of the polygon meshes are supposed to be connected by a spring.

In the curved surface model deformed at the step #18, visual lines passing on the silhouette, points on the curved surface which are the closest to the visual lines, and image points corresponding to the points on the surface of the object Q are obtained again, and the process at the step #18 is repeated. This is repeated until convergence (#19).

The colors of the points on the surface of the object Q are set in an average color vector $m_k$ obtained at step S18 (#20).

The curved surface model whose texture is mapped is rendering-displayed as an image viewed from a virtual camera (#21).

A user makes a specification as the need arises so that scattering of the colors at the points on the curved surface is displayed (#22). This is realized in such a manner that a color vector (red:large/blue:small), in which magnitudes of the covariance matrices of the color vectors of the points on the curved surface are mapped, is replaced by a color vector of the textures at the points on the curved surface so as to be rendering-displayed. Moreover, when the user specifies an arbitrary point on the curved surface, as shown in FIG. 9, the color histogram of the pixels in the silhouette corresponding to the points can be displayed on the images.

On the display at the steps #21 and #22, an unsatisfactory coincidence portion for the input image FT in the three-dimensional model is specified, and this portion is deformed manually or roughness of the curved surface patch on this portion is changed by the user (#23).

In the above-mentioned embodiment, when the volume expression form is converted into the boundary expression form, for example, the well-known zero equivalent surface extracting method or the like can be used. Namely, points corresponding to a zero equivalent surface on sides connecting adjacent apexes (lattice points) are calculated, and a triangular polygon obtained by connecting these points is generated so as to be converted into a polygon mesh.

In the above embodiment, the entire structure of the digital camera DC and the generating apparatus 1 or the structures, shapes, dimensions, number, materials of the respective sections, a type of the object Q and contents of the images can be changed suitably according to the gist of the present invention.

As explained above, according to the present invention, three-dimensional shape model which is suitable to high-quality rendering can be generated simply.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A three-dimensional shape model evaluating apparatus comprising:
   image inputting device for photographing an object corresponding the three-dimensional shape model from a plurality of visual points;
   a projector for projecting points on the three-dimensional shape model onto the plurality of photographed images;
   a specifying device for specifying pixels on the photographed images corresponding to the points on the three-dimensional shape model;
   an obtaining device for obtaining pixel values of the pixels on the photographed images corresponding to the points on the three-dimensional shape model; and
   an evaluating device for evaluating a degree of coincidence between a surface of the three-dimensional shape model and a surface of the object by scattering of the pixel values.

2. A three-dimensional shape model evaluating apparatus according to claim 1, wherein the scattering of the pixel values is scattering of colors.

3. A three-dimensional shape model evaluating apparatus according to claim 1, further comprising a displaying device for displaying the scattering of the pixel values of the pixels on the photographed images corresponding to the points on the three-dimensional shape model.

4. A generating apparatus for generating a three-dimensional shape model of an object based on a plurality of photographed images of the object, the generating apparatus comprising:
   image inputting device for photographing an object corresponding the three-dimensional shape model from a plurality of visual points;
   an arranging device for arranging a three-dimensional shape model in an initial state in a virtual space;
   a specifying device for projecting points on the three-dimensional shape model onto the photographed images and specifying pixels on the photographed images corresponding to the points on the three-dimensional shape model;

an obtaining device for obtaining pixel values of the pixels on the photographed images corresponding to the points on the three-dimensional shape model;

an evaluating device for evaluating a degree of coincidence between a surface of the three-dimensional shape model and a surface of the object by scattering of the pixel values; and a deforming device for deforming the three-dimensional shape model so that the degree of coincidence is improved by the scattering of the pixel values of the pixels becoming small.

5. A generating apparatus according to claim 4, further comprising:

fidelity evaluating device for evaluating fidelity of a silhouette of the object by means of the photographed images to the three-dimensional shape model;

wherein the deforming means deforms the three-dimensional shape model by means of the evaluated result of the fidelity evaluating device.

6. A generating apparatus according to claim 4, wherein the three-dimensional shape model is generated based on a visual hull in the virtual space within a silhouettes of the photographed images, and the generated three-dimensional shape model is arranged as the three-dimensional shape model in the initial state.

7. A generating apparatus according to claim 4, wherein in the case where the points to be specified by the specifying device arte shielded by another portion of the three-dimensional shape model and are not projected onto the photographed images, and in the case where the points are projected out of the photographed images, the points are excluded from the evaluation of the scattering of the pixel values of the pixels as there exist no pixels corresponding to the points on the photographed images from visual points.

8. A generating apparatus according the claim 4, wherein in the case where the pixels on the photographed images corresponding to the points on the three-dimensional shape model do not exist within a silhouettes of the object, the scattering of the pixel values of the pixels is increased as penalty.

9. A three-dimensional shape model evaluating method comprising the steps of:

preparing a plurality of photographed images of an object from different visual points;

projecting points on a three-dimensional shape model onto the photographed images and specifying pixels on the photographed images corresponding to the points on the three-dimensional shape model;

obtaining pixel values of the pixels on the photographed images corresponding to the points on the three-dimensional shape model; and evaluating a degree of coincidence between a surface of the three-dimensional shape model and a surface of the object by scattering of the pixel values.

10. A three-dimensional shape model evaluating method according to claim 9, wherein the evaluation of the scattering of the pixel values is evaluation of the scattering of colors.

11. A three-dimensional shape model evaluating method according to claim 9, further comprising the step of displaying the scattering of the pixel values of the pixels on the photographed images corresponding to the points on the three-dimensional shape model.

12. A generating method of generating a three-dimensional shape model of an object based on a plurality of photographed images of the object, the generating method comprising the steps of photographing an object corresponding the three-dimensional shape model from a plurality of visual points;

arranging a three-dimensional shape model in an initial state in a virtual space;

projecting points on the three-dimensional shape model onto the photographed images and specifying pixels on the photographed images corresponding to the points on the three-dimensional shape model;

obtaining pixel values of the pixels on the photographed images corresponding to the points on the three-dimensional shape model;

evaluating a degree of coincidence between a surface of the three-dimensional shape model and a surface of the object by scattering of the pixel values; and deforming the three-dimensional shape model so that the degree of coincidence is improved by the scattering of the pixel values of the pixels becoming small.

13. A generating method according to claim 12, further comprising the step of evaluating fidelity of a silhouette of the object by means of the photographed images to the three-dimensional shape model, wherein the deforming means deforms the three-dimensional shape model by means of the evaluated result of the evaluating fidelity.

14. A generating method according to claim 12, wherein the three-dimensional shape model is generated based on a visual hull in the virtual space within a silhouettes of the photographed images, and the generated three-dimensional shape model is arranged as the three-dimensional shape model in the initial state.

15. A generating method according to claim 12, wherein in the case where the points to be specified by the specifying device are shielded by another portion of the three-dimensional shape model and are not projected onto the photographed images, and in the case where the points are projected out of the photographed images, the points are excluded from the evaluation of the scattering of the pixel values of the pixels as there exist no pixels corresponding to the points on the photographed images from visual points.

16. A generating method according to claim 12, wherein in the case where the pixels on the photographed images corresponding to the points on the three-dimensional shape model do not exist within a silhouettes of the object, the scattering of the pixel values of the pixels is increased as penalty.

17. A computer program product for evaluating a three-dimensional shape model, the computer program product being embodied in a computer readable medium and comprising computer instructions for:

preparing a plurality of photographed images of an object from different visual points;

projecting points on a three-dimensional shape model onto the photographed images and specifying pixels on the photographed images corresponding to the points on the three-dimensional shape model;

obtaining pixel values of the pixels on the photographed images corresponding to the points on the three-dimensional shape model; and evaluating a degree of coincidence between a surface of the three-dimensional shape model and a surface of the object by scattering of the pixel values.

18. A computer program product for generating a three-dimensional shape model of an object based on a plurality of photographed images of the object, the computer program product being embodied in a computer readable medium and comprising computer instructions for:

photographing an object corresponding the three-dimensional shape model from a plurality of visual points;
arranging a three-dimensional shape model in an initial state in a virtual space;
projecting points on the three-dimensional shape model onto the photographed images and specifying pixels on the photographed images corresponding to the points on the three-dimensional shape model;
obtaining pixel values of the pixels on the photographed images corresponding to the points on the three-dimensional shape model;
evaluating a degree of coincidence between a surface of the three-dimensional shape model and a surface of the object by scattering of the pixel values; and
deforming the three-dimensional shape model so that the degree of coincidence is improved by the scattering of the pixel values of the pixels becoming small.

19. A computer program product according to claim 18, further comprising computer instructions for:

evaluating fidelity of a silhouette of the object by means of the photographed images to the three-dimensional shape model,
wherein the deforming means deforms the three-dimensional shape model by means of the evaluated result of the evaluating fidelity.

20. A computer program product according to claim 18, wherein the three-dimensional shape model is generated based on a visual hull in the virtual space within a silhouettes of the photographed images, and the generated three-dimensional shape model is arranged as the three-dimensional shape model in the initial state.

21. A three-dimensional shape model evaluating apparatus according to claim 1, wherein the pixel values are density values of the pixels.

* * * * *